(12) United States Patent
Hayashi

(10) Patent No.: US 6,880,937 B2
(45) Date of Patent: Apr. 19, 2005

(54) PROJECTION OPTICAL SYSTEM AND IMAGE PROJECTION APPARATUS

(75) Inventor: Kohtaro Hayashi, Toyonaka (JP)

(73) Assignee: Konica Minolta Opto, Inc., Hachioji (JP)

( * ) Notice: Subject to any disclaimer, the term of this patent is extended or adjusted under 35 U.S.C. 154(b) by 0 days.

(21) Appl. No.: 10/732,957

(22) Filed: Dec. 11, 2003

(65) Prior Publication Data

US 2005/0057732 A1 Mar. 17, 2005

(30) Foreign Application Priority Data

Sep. 11, 2003 (JP) ........................................ 2003-319347

(51) Int. Cl.⁷ .......................... G03B 3/00; G03B 21/14; G02B 27/64; G02B 3/00; G02B 9/00
(52) U.S. Cl. .......................... 353/101; 353/100; 353/69; 359/557; 359/649
(58) Field of Search ............................... 353/101, 100, 353/81, 31, 33, 69, 70; 348/771, 742, 744, 766, 740, 746, 747; 349/5; 396/430, 63; 359/554, 557, 649

(56) References Cited

U.S. PATENT DOCUMENTS

| | | | | |
|---|---|---|---|---|
| 5,980,045 A | * | 11/1999 | Fujibayashi | 353/101 |
| 6,113,240 A | * | 9/2000 | Iizuka | 353/31 |
| 2003/0007138 A1 | * | 1/2003 | Shigematsu et al. | 355/67 |

* cited by examiner

Primary Examiner—Judy Nguyen
Assistant Examiner—Rochelle Blackman
(74) Attorney, Agent, or Firm—Sidley Austin Brown & Wood LLP

(57) ABSTRACT

In a projection optical system projecting an image displayed on a predetermined play surface onto a predetermined projection surface, two decentering lens units movable in directions vertical to the optical axis and substantially vertical to each other are included between a rear lens unit situated on the display surface side and a front lens unit situated on the projection surface side, a driving mechanism is provided that reciprocates the two decentering lens units in the directions vertical to the optical axis. When the focal lengths of the two decentering lens units are FD1 and FD2, respectively, and the focal length of the rear lens unit is FR, the relationships $0.01 \leq |FR/FD1| \leq 0.2$ and $0.01 \leq |FR/FD2| \leq 0.2$ are satisfied.

46 Claims, 3 Drawing Sheets

PROJECTION OPTICAL SYSTEM AND IMAGE PROJECTION APPARATUS

This application is based on the application No. 2003-319347 filed in Japan Sep. 11, 2003, the entire content of which is hereby incorporated by reference.

BACKGROUND OF THE INVENTION

1. Field of the Invention

The present invention relates to a projection optical system and an image projection apparatus that project images, and more particularly, to a projection optical system and an image projection apparatus that improve resolution by changing the image position on the projection surface.

2. Description of the Related Art

An image projection apparatus that projects images onto a screen comprises a light valve displaying images and a projection optical system directing light from the light valve representative of an image to a screen to form the image on the screen. The light valve has a multiplicity of pixels arranged with a predetermined pitch, and displays one point of an image for each pixel. Consequently, the resolution of the image is determined by the number of pixels, and when the size of the light valve is fixed, the resolution is determined by the arrangement pitch of the pixels.

While there are various kinds of light valves based on different display principles such as LCDs (liquid crystal displays) and DMDs (digital micro-mirror devices), there is a kind where a part displaying no image is present between pixels. For example, LCDs are provided with a belt-shaped light intercepting portion called a black matrix for the disposition of a driving circuit and the prevention of light mixture. The arrangement pitch of the pixels depends on the pixel size, and the resolution improves as the pixel size decreases. However, in the light valve having a structure such that a part displaying no image is present between pixels as mentioned above, there is a limit to the improvement of the resolution.

In order that the resolution of the provided image is higher than that of the image displayed by the light valve, Japanese Laid-Open Patent Application No. H03-198037 proposes to periodically shift the projection on the screen on the order of the pixel pitch ($1/3$ to one pixel) and change the displayed image according to the shift. By doing this, for example, a point on the screen corresponding to the part between pixels of the light valve at a certain point of time can be made to correspond to the center of the pixels at the next point of time, so that the resolution of the projected image is improved.

As a method of shifting the projected image, Japanese Laid-Open Patent Application No. H03-198037 discloses to tilt the mirror directing illumination light to the light valve, move the light source emitting the illumination light, move the light valve and tilt or move a lens unit in the projection optical system.

When the projected image is shifted by moving a lens unit in the projection optical system, it is necessary to consider that the quality of the projected image changes by the movement of the lens unit. Moreover, it is necessary to move the lens unit at high speed so that the viewer does not notice the image shift on the screen. Further, it is necessary to control the position of the lens unit with accuracy. However, this patent application makes no reference to these.

Normally, in a case where a lens unit included in the projection optical system is decentered (moved in a direction vertical to the optical axis), when the movement amount is $\delta$, the point on the light valve corresponding to the same point on the screen is shifted by approximately $0.5\delta$ to $1.5\delta$. That is, in a case where a light ray is made incident on the projection optical system from the opposite direction, when the lens unit is decentered by $\delta$, the position of the light ray on the light valve is changed by approximately $0.5\delta$ to $1.5\delta$. Hereinafter, a ratio of the shift amount of the position on the light valve corresponding to a point on the screen to the movement (decentering) amount of the lens unit will be referred to as decentering sensitivity.

In recent standard light valves, since the pixel arrangement pitch is $10\ \mu m$ to $20\ \mu m$, in order to cause a pixel shift of approximately the arrangement pitch in the projected image, the lens unit is moved by approximately $6\ \mu m$ to $40\ \mu m$. The lens unit in the projection optical system has, in the case of a high performance lens unit, an effective diameter $\Phi$ of not less than approximately 30 mm although it depends on the size of the light valve and the lens back focal length. To mechanically drive such a large lens unit with a high accuracy of 6 to $40\ \mu m$, extremely highly accurate processing and adjustment are required. Under the present circumstances, an actuator suitable for such a high accuracy is absent. A position sensor detecting the position of the lens unit to change the image according to the position of the lens unit which sensor is suitable for such accuracy is also absent.

The lens units included in the projection optical system are fixed to the lens frame with extremely high accuracy, and their performances deteriorate when a tilt error or the like occurs. When any of the lens units is capable of being decentered, a tilt error or the like readily occurs on the lens unit, which results in degradation in the performance of the projection optical system. In particular, when a lens unit having strong optical power which lens unit is essential to projection is decentered, performance degradation cannot be avoided, so that the image quality is degraded although the resolution is improved.

SUMMARY OF THE INVENTION

An object of the present invention is to provide a projection optical system and an image projection apparatus solving the above-mentioned problem.

Another object of the present invention is to provide a projection optical system where lens units are decentered to improve the resolution of the projected image which projection optical system is easily realized and has high performance, and a high-performance image projection apparatus having such a projection optical system.

To attain the above-mentioned objects, according to the present invention, in a projection optical system projecting an image displayed on a predetermined display surface onto a predetermined projection surface, two decentering lens units movable in directions vertical to the optical axis and substantially vertical to each other are included between a rear lens unit situated on the display surface side and a front lens unit situated on the projection surface side, a driving mechanism is provided that reciprocates the two decentering lens units in the directions vertical to the optical axis, and when the focal lengths of the two decentering lens units are FD1 and FD2, respectively, and the focal length of the rear lens unit is FR, the relationships $0.01 \leq |FR/FD1| \leq 0.2$ and $0.01 \leq |FR/FD2| \leq 0.2$ are satisfied.

This projection optical system includes two lens units capable of being decentered in the directions substantially vertical to each other between the rear lens unit and the front lens unit, and with this, the projected image can be shifted on the projection surface. The locus of the image shifted on the projection surface can be set according to relatively at which time the two decentering lens units are moved, and can be, for example, a circle or a quadrangle.

The focal lengths of the two decentering lens units are both 5 to 100 times the focal length of the rear lens unit, and the optical powers thereof are extremely weak. For this reason, even if a tilt error or the like occurs on these decentering lens units, it hardly affects the overall performance of the projection optical system, and high performance can be ensured. Moreover, the two decentering lens units may be added to already designed projection optical systems, and it is therefore unnecessary to newly design the entire projection optical system.

That the optical powers of the decentering lens units are weak means that the decentering sensitivities thereof are also low. Therefore, in order to cause a pixel shift of approximately one pixel in the projected image, the decentering lens units are moved by amounts several or more times the arrangement pitch of the pixels of the image displayed on the display surface, so that the movement amounts of the decentering lens units are increased. When the movement amounts are large, the decentering lens units can be set in predetermined positions without the use of a particularly highly accurate actuator as the actuator for driving the decentering lens units, so that a currently available actuator can be adopted.

Since the driving mechanism for driving the two decentering lens units are provided, it is unnecessary to provide a driving mechanism in the apparatus using the projection optical system. Consequently, the projection optical system is made interchangeable.

Moreover, to attain the above-mentioned objects, according to the present invention, in a projection optical system projecting an image displayed on a predetermined display surface onto a predetermined projection surface, two decentering lens units movable in directions vertical to the optical axis and substantially vertical to each other are included on the most end part on the display surface side, a driving mechanism is provided that reciprocates the two decentering lens units in the directions vertical to the optical axis, and when the focal lengths of the two decentering lens units are FD1 and FD2, respectively, and the air distance equivalent of the lens back focal distance of the part except the two decentering lens units is LB, the relationships $0.01 \leq |LB/FD1| \leq 0.2$ and $0.01 \leq |LB/FD2| \leq 0.2$ are satisfied.

This projection optical system has no lens units on the display surface side of the two decentering lens units. The focal lengths of the two decentering lens units are both 5 to 100 times the lens back focal distance, and the optical powers thereof are extremely weak. For this reason, like in the above-described projection optical system, high performance can be ensured even if a tilt error or the like occurs on the decentering lens units. Moreover, a particularly highly accurate actuator is unnecessary for driving the decentering lens units.

Moreover, to attain the above-mentioned objects, according to the present invention, in an image projection apparatus displaying an image and projecting it onto a predetermined projection surface, the following are provided: any of the above-described projection optical systems; and a light valve situated on the display surface, displaying an image and making light representative of the displayed image incident on the projection optical system, the light valve has a plurality of pixels arranged with a predetermined pitch and each displaying one point of the image, and the image displayed on pixels are changed according to the positions of the two decentering lens units of the projection optical system.

In this image projection apparatus, the image to be projected can be changed according to the position of the image to be projected which is being shifted on the projection surface, and for example, a point on the projection surface corresponding to a part between pixels of the light valve at a certain point of time can be made to correspond to the center of the pixels at the next point of time, so that high-resolution images can be provided Further, since the performance of the projection optical system does not deteriorate even though the decentering lens units are moved, high-quality images can be provided.

BRIEF DESCRIPTION OF THE DRAWINGS

These and other objects, advantages and features of the invention will become apparent from the following description thereof taken in conjunction with the preferred embodiments with the reference to the accompanying drawings in which.

DETAILED DESCRIPTION OF THE PREFERRED EMBODIMENTS

Figure 1:
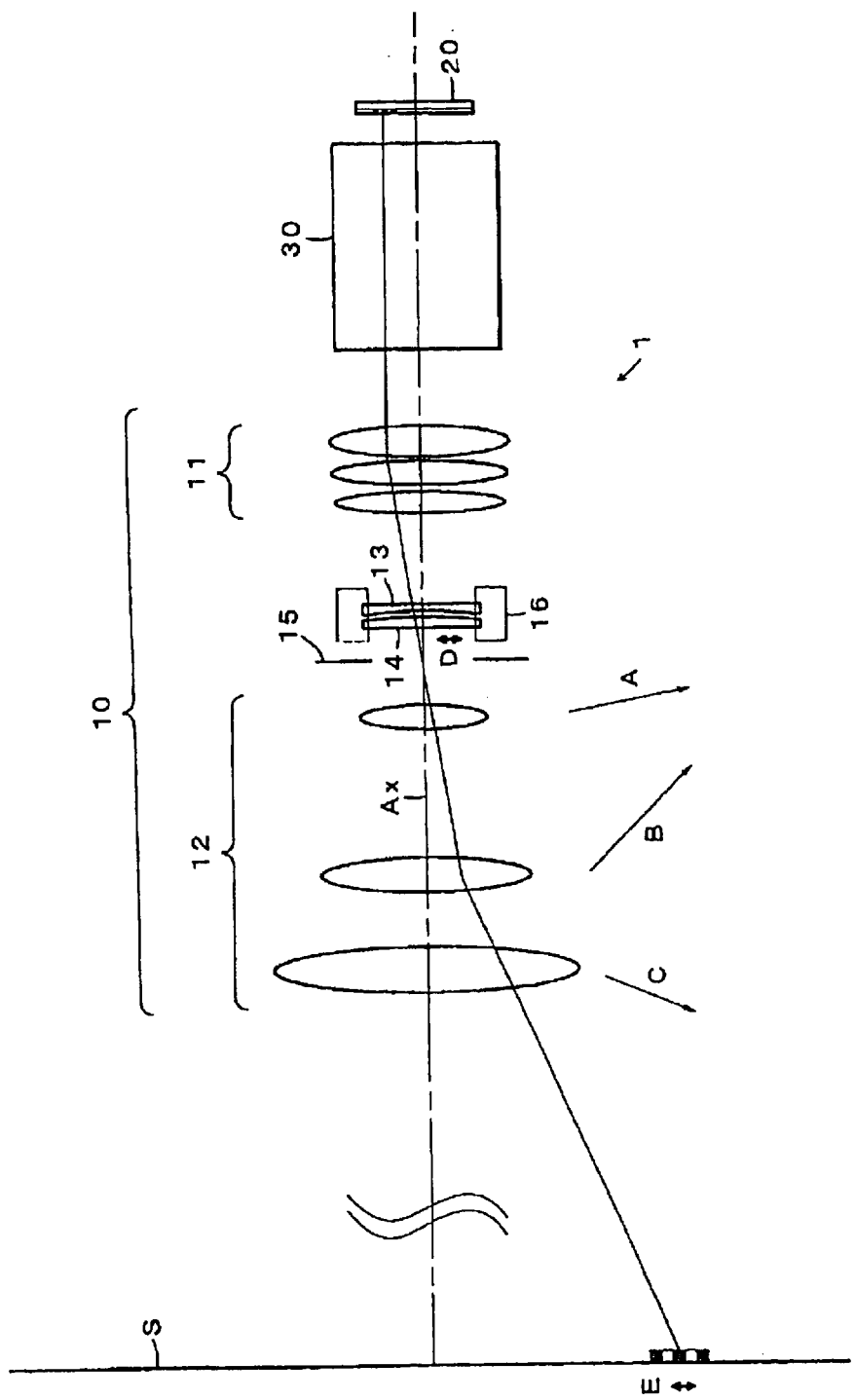
FIG. 1 is a view schematically showing the optical structure of an image projection apparatus according to a first embodiment.

Hereinafter, preferred embodiments of the present invention will be described with reference to the drawings. FIG. 1 schematically shows the optical structure of an image projection apparatus 1 according to a first embodiment. The projection optical system 1 is provided with: a light valve 20 displaying images; and a projection optical system 10 directing light from the light valve 20 representative of an image to a predetermined projection surface S so as to be imaged, and projecting the image on the display surface of the light valve 20 onto the projection surface S. By disposing a screen on the projection surface S, the viewer can view the projected image.

The light valve 20 comprises a multiplicity of pixels two-dimensionally arranged with a fixed pitch, and each pixel displays one point of an image. Examples of the light valve include transmissive LCDs, reflective LCDs and DMDs (digital micro-mirror devices). However, it is not limited thereto. There are three light valves 20 (two of them are not shown), and they display images representative of red (R) components, green (G) components and blue (B) components of the image, respectively. The image projection apparatus 1 has a color integrating prism 30 between the light valve 20 and the projection optical system 10. Light rays from the three light valves 20 are integrated together by the color integrating prism 30 and directed to the projection optical system 10. This enables the image projection apparatus 1 to provide color images.

The projection optical system 10 includes: a rear lens unit 11 near the light valve 20; a front lens unit 12 near the projection surface S; and two lens units 13 and 14 situated between the rear lens unit 11 and the front lens unit 12. The projection optical system 10 has a pupil between the rear lens unit 11 and the front lens unit 12, and has an aperture stop 15 near the pupil. The two lens units 13 and 14 are disposed near the aperture stop 15.

The projection optical system 10 is a zoom optical system whose focal length is variable. Lens units moved along the optical axis Ax for zooming are included only in the front lens unit 12. The arrows A, B and C shown in FIG. 1 represent the positions of the lens units that move for zooming.

The two lens units 13 and 14 are capable of being decentered, that is, movable in a direction vertical to the optical axis Ax. Hereinafter, these lens units 13 and 14 will also be referred to as decentering lens units. The movement direction of the decentering lens unit 13 and that of the decentering lens unit 14 are substantially vertical to each other. For example, the decentering lens unit 13 moves in a direction vertical to the plane of FIG. 1, and the decentering lens unit 14 moves in a direction along the plane of FIG. 1. The movement of the decentering lens unit 14 is represented by the arrow D. The decentering lens units 13 and 14, which are disposed near the aperture stop 15, are compact and lightweight.

The image projection apparatus 1 shifts the image on the projection surface by changing the light travel direction by moving the decentering lens units 13 and 14, and changes the contents displayed by the pixels of the light valve 20 according to the positions of the decentering lens units 13 and 14. The shift of the image on the projection surface by the movement of the decentering lens unit 14 is represented by the arrow E. The decentering lens units 13 and 14 are moved so that a part of the image on the projection surface which part corresponds to the space between pixels of the light valve 20 at a certain point of time corresponds to the center of the pixels of the light valve 20 at a different point of time. With this, the resolution of the image on the projection surface is higher than that of the image on the light valve 20.

Since the pixels of the light valve 20 change their display contents according to the positions of the decentering lens units 13 and 14, the display contents are changed according to the corresponding positions on the projection surface. The pixels display the contents corresponding to the corresponding positions on the projection surface. Therefore, even though the image shifts on the projection surface, the shift is never visually recognized by the viewer.

Figure 2:
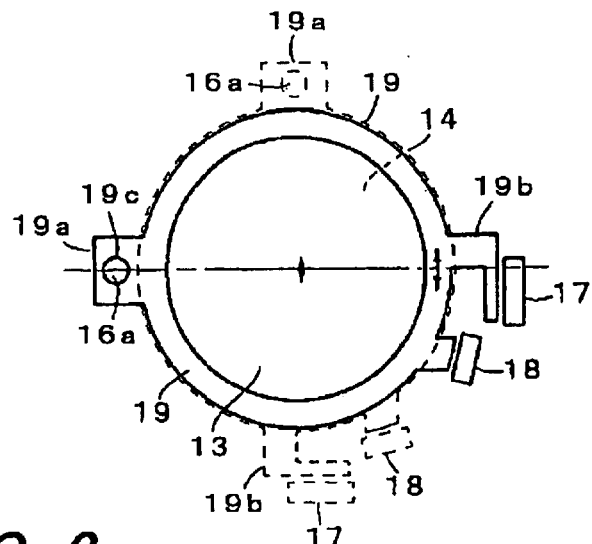
FIG. 2 is a front view schematically showing decentering lens units provided in a projection optical system of the image projection apparatus, and the periphery thereof.

The projection optical system 1 has a driving mechanism 16 for moving the decentering lens units 13 and 14. FIG. 2 schematically shows the periphery of the decentering lens units 13 and 14 viewed from the direction of the optical axis Ax. The decentering lens unit 13 is fixed to a lens frame 19. The center of the lens frame 19, consequently the center of the decentering lens unit 13 is situated on the optical axis Ax. The lens frame 19 has protrusions 19a and 19b in positions opposite to each other with respect to the center of the decentering lens unit 13.

A hole 19c is formed in one protrusion 19a, and a pin 16a provided on the driving mechanism 16 is inserted in the hole 19c. The lens frame 19 is rotatable about the pin 16a. An actuator 17 provided in the driving mechanism 16 is situated in the vicinity of the other protrusion 19b. The actuator 17 applies a force in a direction vertical to the pin 16a to the protrusion 19b to thereby rotate the lens frame 19 together with the decentering lens unit 13. To the driving mechanism 16, a position sensor 18 for detecting the position of the lens frame 19 is attached. The position sensor 18 is situated near the actuator 17.

The structure for holding and driving the decentering lens unit 14 and the structure for detecting the position of the decentering lens unit 14 are similar to the above-described structures for the decentering lens unit 13. However, the center of rotation of the decentering lens unit 14 is present in a position which is the center of rotation of the decentering lens unit 13 rotated 90° with respect to the optical axis Ax. In FIG. 2, in order that the structures associated with the decentering lens unit 13 are easily distinguished from the structures associated with the decentering lens unit 14, the latter are represented by dotted lines.

The actuator 17 of the driving mechanism 16 drives the decentering lens units 13 and 14 so as to reciprocate. The driving of the decentering lens units 13 and 14 by the actuator 17 is performed at a high speed such that the decentering lens units 13 and 14 make one reciprocation while the light valve 20 is displaying one frame of an image.

Since the distances from the centers of rotation of the decentering lens units 13 and 14 to the parts where the actuator 17 applies a driving force to the decentering lens units 13 and 14 are approximately twice the distances from the centers of rotation of the decentering lens units 13 and 14 to the centers of the decentering lens units 13 and 14, the driving amounts that the actuator 17 applies to the decentering lens units 13 and 14 are approximately twice the amounts by which the centers of the decentering lens units 13 and 14 are to be moved. Moreover, since the position sensor 18 is situated close to the actuator 17, the changes of the positions of the decentering lens units 13 and 14 are detected being enlarged approximately twice.

Since the decentering lens units 13 and 14 rotate, the loci of their centers are, strictly, arcs. However, in a range where the movement amounts of the decentering lens units 13 and 14 are approximately 1 mm, the loci can be regarded as straight lines. Therefore, the control of the actuator 17 is easy.

The locus of the image shifting on the projection surface (the locus of light from each pixel of the light valve 20) is determined by the timing of the driving of the decentering lens unit 13 and the timing of the driving of the decentering lens unit 14 by the actuator 17. By driving the decentering lens units 13 and 14 so that the distance from the optical axis Ax is a sinusoidal curve and there is a phase difference of 90° between the positions of the decentering lens units 13 and 14, the locus of the image shifting on the projection surface is a circle. Moreover, by driving the decentering lens units 13 and 14 so as to move alternately, the locus of the image on the projection surface is a quadrangle.

The display contents of the pixels of the light valve 20 are changed not in such a manner that even a slight change of the position of the image on the projection surface causes the pixels of the light valve 20 to change their display contents but in such a manner that the locus of the image on the projection surface is divided into a plurality of regions and the pixels of the light valve 20 continue the display of the same contents while the position of the image is in the regions and changes the display contents when the position of the image enters the next regions.

The decentering lens unit 13 comprises a plano-concave lens element, and the decentering lens unit 14 comprises a plano-convex lens element. These are disposed so that their curved surfaces are opposed to each other. Moreover, the focal lengths of the decentering lens units 13 and 14 are substantially equal to each other, and are several or more times as long as the focal length of the rear lens unit 11. When the focal lengths of the decentering lens units 13 and 14 are FD1 and FD2, respectively, and the focal length of the rear lens unit 11 is FR, the relationships of the following expressions (1) and (2) are satisfied:

$$0.01 \leq |FR/FD1| \leq 0.2 \quad (1)$$

$$0.01 \leq |FR/FD2| \leq 0.2 \quad (2)$$

Since the optical power of a lens is the reciprocal of the focal length, the optical powers of the decentering lens units 13 and 14 are as week as $1/10$ to $1/5$ the optical power of the rear lens unit. When the optical powers of the decentering lens units 13 and 14 are weak as mentioned above, the decentering sensitivities of the decentering lens units 13 and 14 are also low, so that the movement amounts of the decentering lens units 13 and 14 are increased to shift the image on the projection surface.

The decentering sensitivities of the decentering lens units 13 and 14 are obtained from the partial magnifications thereof and the partial magnification of the rear lens unit 11 situated nearer to the light valve 20 than the decentering lens units 13 and 14. Specifically, when the partial magnification of the decentering lens unit 13 is $\beta D1$ and the partial magnification of the rear lens unit 11 is $\beta R$, the decentering sensitivity of the decentering lens unit 13 is $(1-\beta D1)\cdot\beta R$.

The decentering lens unit 13 is situated in the vicinity of the aperture stop 15, and the projection optical system 10 is set, like typical projection optical systems, so as to be afocal on the front lens unit 12 side of the vicinity of the aperture stop 15. Therefore, the decentering sensitivity of the decentering lens unit 13 can be approximated to FR/FD1. Likewise, the decentering sensitivity of the decentering lens unit 14 can be approximated to FR/FD2. Therefore, the expressions 1 and 2 represent the ranges of the decentering sensitivities of the decentering lens units 13 and 14.

A projection image on the projection surface is composed of a plurality of image elements, and each image element displays one point of the projection image. The image element corresponds to the pixel of the light valve 20. The projection optical system 10 causes an image shift of approximately 0.3 to one image element in the projection image on the projection surface. That is to say, when a light is made incident on the projection optical system from the projection surface side, the position of the light on the light valve 20 is changed by 0.3 to one time the arrangement pitch of the pixels of the light valve 20 by moving the decentering lens units 13 and 14. Since the decentering sensitivities of the decentering lens units 13 and 14 are low as mentioned above, to cause such the image shift, the movement amounts of the decentering lens units 13 and 14 are set so as to be several or more times the arrangement pitch of the pixels of the light valve 20. For example, when as the light valve, one whose pixel arrangement pitch is 20 µm is used and an image shift of 0.5 image elements is caused in the image on the projection surface, the movement amounts of the decentering lens units 13 and 14 are 50 µm to 1 mm.

The actuator 17 of the driving mechanism 16 generates a driving distance as long as approximately 0.1 mm to 2 mm which is twice the above-mentioned value, and it is therefore unnecessary for it to have an accuracy of the order of µm. As the actuator 17, one is used of a high speed such that the decentering lens units 13 and 14 can make one reciprocation in the period of one frame displayed by the light valve 20.

Unless the absolute values |FR/FD1| and |FR/FD2| of the focal length ratios reach the lower limits of the expressions 1 and 2, the amounts by which the decentering lens units 13 and 14 are moved are excessive, so that the driving mechanism 16 increases in size. In addition, an actuator 17 having a strong driving force is required, so that noises are apt to be caused. By satisfying the relationships of the expressions 1 and 2, the display contents of the pixels of the light valve 20 can be approximately changed according to the positions of the decentering lens units 13 and 14 while the occurrence of such a problem is avoided.

More desirably, the relationships of the following expressions (3) and (4) are satisfied:

$$0.02 \leq |FR/FD1| \leq 0.15 \quad (3)$$

$$0.02 \leq |FR/FD2| \leq 0.15 \quad (4)$$

With this, the variety of devices that can be used as the actuator 17 or the position sensor 18 increases, so that upsizing of the driving mechanism 16 can be further suppressed.

A concrete example of the focal lengths is shown in Table 1.

<Table 1>
Focal length FD1 of the decentering lens unit 13: −2409.8 mm
Focal length FD2 of the decentering lens unit 14: 2409.8 mm
Focal length FR of the rear lens unit 11: 97.74 mm $$|FR/FD1|=|FR/FD2|=0.04$$

Since the decentering lens units 13 and 14 have weak optical powers as mentioned above, even if they are largely moved, it hardly affects the performance of the projection optical system 10 and never degrades the quality of the projected image. Even if the driving of the decentering lens units 13 and 14 causes a tilt error or the like on the lens units 13 and 14, the image quality degradation is slight. In particular, since the decentering lens unit 13 has negative optical power, the decentering lens unit 14 has positive optical power and the optical powers of both cancel each other, the performance degradation due to a tilt error or the like is further reduced.

While in the present embodiment, the decentering lens unit 13 nearer to the light valve 20 has negative optical power and the decentering lens unit 14 nearer to the projection surface has positive optical power, the decentering lens units 13 and 14 may have positive optical power and negative optical power, respectively. Moreover, the decentering lens units 13 and 14 may comprise a bi-concave lens element and a bi-convex lens element instead of comprising a plano-concave lens element and a plano-convex lens element.

It is desirable that the decentering lens units 13 and 14 comprise a plano-concave lens element and a plano-convex lens element and the curved surfaces thereof be opposed to each other like in the present embodiment, because the decentering lens units 13 and 14 have optical characteristics close to those of a plane parallel plate as a whole and the degradation in the performance of the projection optical system caused when a tilt error occurs is more easily prevented. The decentering lens units 13 and 14 can each comprise a plurality of lens elements. However, when they each comprise a single lens element, the weight is light and high-speed driving is therefore easier.

Figure 3:
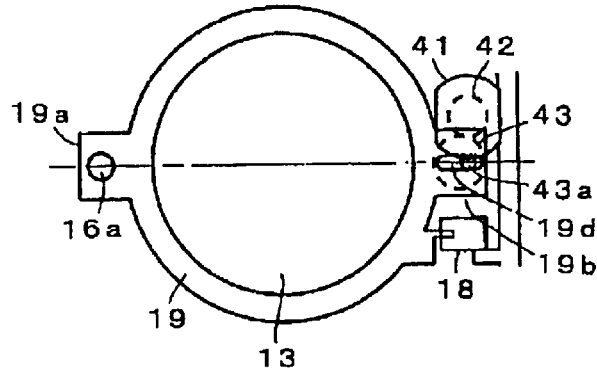
FIG. 3 is a view showing the structure of a driving mechanism driving the decentering lens units.

FIG. 3 shows the concrete structure of the driving mechanism 16. The driving mechanism 16 has a DC motor 41 as the actuator 17. To the drive shaft of the DC motor 41, a gear 42 is attached, and the gear 42 meshes with a reduction gear 43. The gear 43 has a pin 43a parallel to the axis of rotation in a position off the center of rotation thereof. On the protrusion 19b of the lens frame 19, a groove 19d is formed that is parallel to a straight line connecting the pin 16a being the center of rotation and the center of the decentering lens units 13 and 14, and the pin 43a is inserted in the groove 19d.

When the DC motor 41 rotates, the pin 43a rotates so as to be decentered, and the lens frame 19 follows in such a manner as to cause the pin 43a to slide on the groove 19d. This rotates the decentering lens units 13 and 14, and the decentering lens units 13 and 14 make one reciprocation while the pin 43a makes one revolution. When the DC motor 41 is rotated at constant speed, the distance of the center of the decentering lens units 13 and 14 from the optical axis Ax is a sinusoidal curve, and by causing a phase difference of 90° between the positions of the decentering lens units 13 and 14, the locus of the image on the projection surface can be made circular.

According to this structure, the movement widths of the decentering lens units 13 and 14 are fixed with reliability. Moreover, by the inertia of the rotation of the gear 43 being high to some extent, the pin 43a can be rotated at stable speed, and the drive period can be made fixed. Consequently, only by maintaining fixed the phase difference between the position of the decentering lens unit 13 and the position of the decentering lens unit 14, the locus of the image on the projection surface can be made fixed.

For this reason, as the position sensor 18, a simple one that merely detects the phase difference between the decentering lens units 13 and 14 can be used. In this example, a part of the lens frame 19 reflects light, and as the position sensor 18, a photoreflector is used that comprises a light emitting diode (LED) emitting light toward the lens frame 19 and a photodiode (PD) detecting the reflected light from the lens frame 19.

Instead of providing separate DC motors for the driving of the decentering lens units 13 and 14, a single DC motor 14 may be used for the driving of both of the decentering lens units 13 and 14. This can be easily realized by further interposing a gear between the DC motor 41 and one of the decentering lens units 13 and 14 that is farther from the DC motor 41. With this, the phase difference between the positions of the decentering lens units 13 and 14 is inevitably fixed, so that it is unnecessary to control the phase difference.

Figure 4:
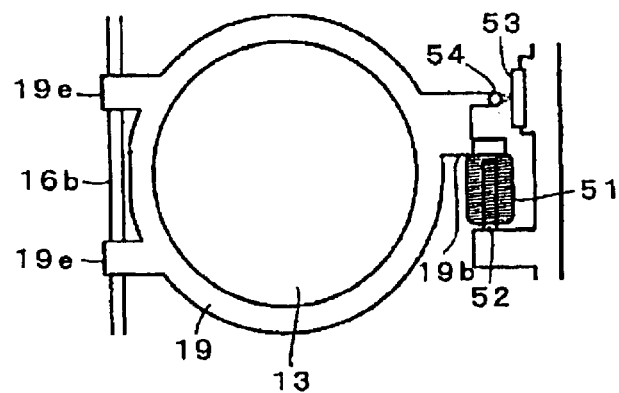
FIG. 4 is a view showing the structure of another driving mechanism driving the decentering lens units.

The driving mechanism 16 is not necessarily a mechanism that rotates the decentering lens units 13 and 14 as described above but may be a mechanism that linearly moves the decentering lens units 13 and 14: FIG. 4 shows an example of the driving mechanism 16 that linearly drives the decentering lens units 13 and 14.

The driving mechanism 16 has a linear guide shaft 16b, and on the lens frame 19, two protrusions 19e each having a hole through which the guide shaft 16b is passed are provided instead of the above-mentioned protrusion 19a. Moreover, to the protrusion 19b of the lens frame 19, a coil 51 is attached so that its axis of winding is parallel to the guide shaft 16b. On the driving mechanism 16, a bar-shaped magnet 52 is provided so as to be also parallel to the guide shaft 16b. The magnet 52 is situated inside the coil 51, and the decentering lens units 13 and 14 move by passing current through the coil 51. The coil 51 and the magnet 52 constitute the actuator 17.

According to this structure, the decentering lens units 13 and 14 can also be driven so that the distance from the optical axis Ax draws a sinusoidal curve, and the locus of the image on the projection surface can be made circular by causing a phase difference of 90° between the positions of the decentering lens units 13 and 14. However, the driving by the coil 51 and the magnet 52 is slightly inferior in stability to the above-described driving by the DC motor 41 and the pin 43a. For this reason, a PSD (position sensitive detector) 53 whose output signal varies according to the position of light incidence is used as the position sensor 18, and the current passed through the coil 51 is fed back based on the output signal. On the protrusion 19b of the lens frame 19, an LED 54 is provided that emits light toward the PSD 53.

According to the structure linearly driving the decentering lens units 13 and 14 as described above, it is necessary to generate a driving amount equal to the amount by which the centers of the decentering lens units 13 and 14 are to be moved, and the driving amount is approximately half that of the above-described structure rotating the decentering lens units 13 and 14. However, since the decentering sensitivities of the decentering lens units 13 and 14 are low, the driving amount is large, and the control of the positions of the decentering lens units 13 and 14 is never difficult.

It is desirable that the decentering lens units 13 and 14 be integrated with the driving mechanism 16 including the actuator 17 and the position sensor 18 into a single optical unit. The decentering lens units 13 and 14, which have a long focal length and do not affect the optical system for image formation, can be incorporated in projection optical systems of different specifications. By integrating the decentering lens units 13 and 14 with the driving mechanism 16 into an optical unit, the decentering lens units 13 and 14 are easily incorporated in projection optical systems, so that the manufacturing efficiency of projection optical systems having a function to improve resolution by shifting the image on the projection surface is improved.

Figure 5:
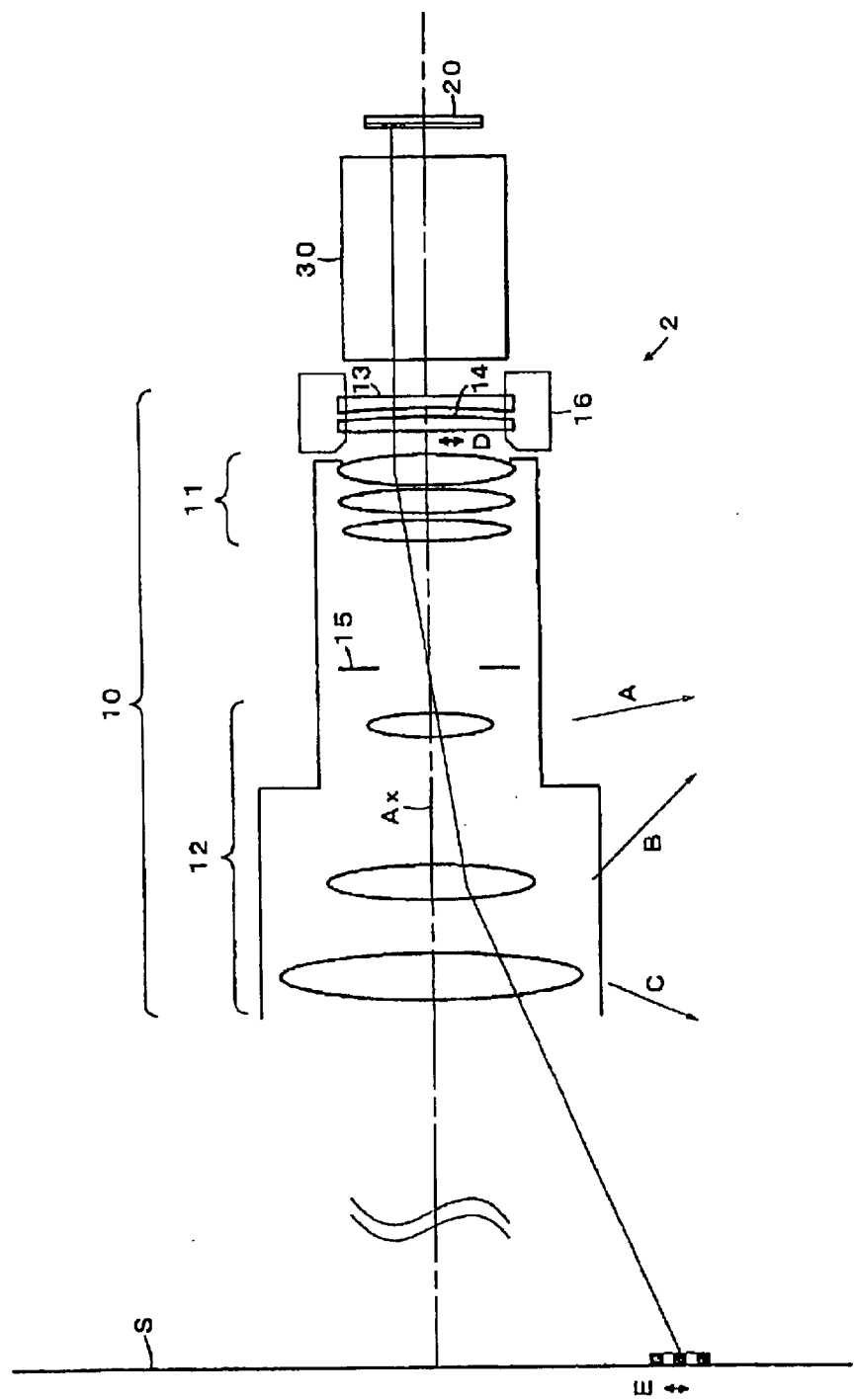
FIG. 5 is a view schematically showing the optical structure of an image projection apparatus according to a second embodiment.

FIG. 5 shows the optical structure of an image projection apparatus 2 according to a second embodiment. The image projection apparatus 2 is different from the image projection apparatus 1 of the first embodiment only in the projection optical system 10, and the light valve 20 displaying images and the color integrating prism 30 integrating the light rays from the light valve 20 together and directing it to the projection optical system 10 are the same as those of the image projection apparatus 1.

In the projection optical system 10 of the image projection apparatus 2, the above-described decentering lens units 13 and 14 and the driving mechanism 16 are disposed on the end on the side of the light valve 20. The focal lengths of the decentering lens units 13 and 14 are substantially equal to each other, and are set so as to be several or more times as long as the air distance equivalent of the lens back focal distance of the entire projection optical system 10 except the decentering lens units 13 and 14.

When the focal lengths of the decentering lens units 13 and 14 are FD1 and FD2, respectively, and the lens back focal distance which is converted into an air distance equivalent in consideration of the presence of the decentering lens units 13 and 14 is LB, the relationships of the following expressions (5) and (6) are satisfied:

$$0.01 \leq |LB/FD1| \leq 0.2 \tag{5}$$

$$0.01 \leq |LB/FD2| \leq 0.2 \tag{6}$$

When the decentering lens units 13 and 14 are disposed on an end of the projection optical system 10 like in the present embodiment, by the focal lengths FD1 and FD2 of the decentering lens units 13 and 14 being 5 to 100 times the air distance equivalent LB of the lens back focal distance as described above, the decentering sensitivities of the decentering lens units 13 and 14 can be reduced to such an extent that it is unnecessary to use an actuator and a position sensor of particularly high accuracy for the driving of the decentering lens units 13 and 14 and the detection of the positions thereof and that the driving mechanism 16 does not largely increase in size.

More desirably, the relationships of the following expressions (7) and (8) are satisfied:

$$0.02 \leq |LB/FD1| \leq 0.15 \qquad (7)$$

$$0.02 \leq |LB/FD2| \leq 0.15 \qquad (8)$$

The structure of the driving mechanism 16 is the same as that shown the first embodiment. The image projection apparatus may have a structure such that the decentering lens units 13 and 14 and the driving mechanism 16 are separated from the projection optical system 10 and are provided in a main unit including the light valve 20 and the color integrating prism 30. With this, an existing projection optical system can be used as an interchangeable lens.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A projection optical system for projecting an image displayed on a predetermined display surface onto a predetermined projection surface comprising:

a front lens unit situated on the projection surface side;

a rear lens unit situated on the display surface side;

a first decentering lens unit situated between the front lens unit and the rear lens unit, movable in a direction perpendicular to an optical axis of the projection optical system;

a second decentering lens unit situated between the front lens unit and the rear lens unit, movable in a direction perpendicular to an optical axis of the projection optical system and substantially perpendicular to a direction where the first decentering lens unit is moved; and a driving mechanism for continuously reciprocating the first and second decentering lens units in directions perpendicular to the optical axis, wherein the projected image on the projection surface is periodically shifted by reciprocating the first and second decentering lens units, and wherein the following conditions are fulfilled:

$$0.01 \leq |FR/FD1| \leq 0.2, \text{ and}$$

$$0.01 \leq |FR/FD2| \leq 0.2,$$

where FD1 represents a focal length of the first decentering lens unit, FD2 represents a focal length of the second decentering lens unit, and FR represents a focal length of the rear lens unit.

2. The projection optical system as claimed in claim 1, wherein the first decentering lens unit has positive optical power, and the second decentering lens unit has negative optical power.

3. The projection optical system as claimed in claim 2, wherein the first decentering lens unit is a plane-convex lens element, the second decentering lens unit is a plane-concave lens element, and curved surfaces thereof are opposed to each other.

4. The projection optical system as claimed in claim 1, further comprising an aperture stop situated between the front and rear lens units, and wherein the first and second decentering lens units are situated at the vicinity of the aperture stop.

5. The projection optical system as claimed in claim 1, wherein the projection optical system is a zoom optical system having a movable lens unit that is movable in a direction of the optical axis for zooming, the movable lens unit being included only in the front lens unit.

6. The projection optical system as claimed in claim 1, wherein the first and second decentering lens units are supported by lens frames, individually, and wherein the driving mechanism includes:

a supporter for supporting the lens frame so as to be rotatable; and an actuator for rotating the lens frame about the supporter in a plane perpendicular to the optical axis of the projection optical system, the actuator disposed substantially on the opposite side of the supporter with respect to a center of the decentering lens unit.

7. The projection optical system as claimed in claim 1, wherein the first and second lens units are supported by lens frames, individually, and wherein the driving mechanism includes:

a guide shaft for guiding a movement of the decentering lens unit, fitted in a through hole provided in the lens, frame;

an actuator for linearly reciprocating the lens frame along the guide shaft, disposed on the opposite side of the guide shaft with respect to a center of the decentering lens unit.

8. The projection optical system as claimed in claim 1, wherein the first and second decentering lens units and the driving mechanism are integrated into a single optical unit.

9. A projection optical system for projecting an image displayed on a predetermined display surface onto a predetermined projection surface comprising:

a first decentering lens unit movable in a direction perpendicular to an optical axis of the projection optical system;

a second decentering lens unit movable in a direction perpendicular to an optical axis of the projection optical system and substantially perpendicular to a direction where the first decentering lens unit is moved; and a driving mechanism for continuously reciprocating the first and second decentering lens units in directions perpendicular to the optical axis, wherein the projected image on the projection surface is periodically shifted by reciprocating the first and second decentering lens units, and wherein the first and second decentering lens units are disposed on a most end part of the display side of the projection optical system and following conditions are fulfilled:

$$0.01 \leq |LB/FD1| \leq 0.2, \text{ and}$$

$$0.01 \leq |LB/FD2| \leq 0.2,$$

where FD1 represents a focal length of the first decentering lens unit, FD2 represents a focal length of the second decentering lens unit, and LB represents an air distance equivalent of a back focal distance of a part of the projection optical system except the first and second decentering lens units.

10. The projection optical system as claimed in claim 9, wherein the first decentering lens unit has positive optical power, and the second decentering lens unit has negative optical power.

11. The projection optical system as claimed in claim 10, wherein the first decentering lens unit is a plane-convex lens element, the second decentering lens unit is a plane-concave lens element, and curved surfaces thereof are opposed to each other.

12. The projection optical system as claimed in claim 9, wherein the projection optical system is a zoom optical system whose focal length is variable.

13. The projection optical system as claimed in claim 9, wherein the first and second decentering lens units are supported by lens frames, individually, and wherein the driving mechanism includes:

a supporter for supporting the lens frame so as to be rotatable; and an actuator for rotating the lens frame about the supporter in a plane perpendicular to the optical axis of the projection optical system, the actuator disposed substantially on the opposite side of the supporter with respect to a center of the decentering lens unit.

14. The projection optical system as claimed in claim 9, wherein the first and second lens units are supported by lens frames, individually, and wherein the driving mechanism includes:

a guide shaft for guiding a movement of the decentering lens unit, fitted in a through hole provided in the lens frame;

an actuator for linearly reciprocating the lens frame along the guide shaft, disposed on the opposite side of the guide shaft with respect to a center of the decentering lens unit.

15. The projection optical system as claimed in claim 9, wherein the first and second decentering lens units and the driving mechanism are integrated into a single optical unit.

16. An image projection apparatus for projecting an image displayed on a predetermined display surface onto a predetermined projection surface comprising a projection optical systems, the projection optical system including:

a front lens unit situated on the projection surface side;

a rear lens unit situated on the display surface side;

a first decentering lens unit situated between the front lens unit and the rear lens unit, movable in a direction perpendicular to an optical axis of the projection optical system;

a second decentering lens unit situated between the front lens unit and the rear lens unit, movable in a direction perpendicular to an optical axis of the projection optical system and substantially perpendicular to a direction where the first decentering lens unit is moved;

a driving mechanism for continuously reciprocating the first and second decentering lens units in directions perpendicular to the optical axis; and a light valve situated on the display surface for displaying an image, having a plurality of pixels arranged with a predetermined pitch, each pixel displaying one point of the image, wherein the projected image on the projection surface is periodically shifted by reciprocating the first and second decentering lens units, wherein the image displayed on pixels is changed according to positions of the first and second decentering lens units, and wherein the following conditions are fulfilled;

$0.01 \leq |FR/FD1| \leq 0.2$, and $0.01 \leq |FR/FD2| \leq 0.2$, where FD1 represents a focal length of the first decentering lens unit, FD2 represents a focal length of the second decentering lens unit, and FR represents a focal length of the rear lens unit.

17. The image projection apparatus as claimed in claim 16, wherein the first decentering lens unit has positive optical power, and the second decentering lens unit has negative optical power.

18. The image projection apparatus as claimed in claim 17, wherein the first decentering lens unit is a plane-convex lens element, the second decentering lens unit is a plane-concave lens element, and curved surfaces thereof are opposed to each other.

19. The image projection apparatus as claimed in claim 16, wherein the projection optical system is a zoom optical system whose focal length is variable.

20. The image projection apparatus as claimed in claim 16, wherein the pixel of the light valve is projected onto the projection surface by the projection optical system as an image element, and wherein movements of the first and second decentering lens units cause an image shift of 0.3 to 1 times of a pitch of the image element in a projection image on the projection surface.

21. The image projection apparatus as claimed in claim 16, wherein a locus of an image shifting on the projection surface by movements of the first and second decentering lens units is a circle.

22. The image projection apparatus as claimed in claim 16, wherein a locus of an image shifting on the projection surface by movements of the first and second decentering lens units is a quadrangle.

23. An image projection apparatus for projecting an image displayed on a predetermined display surface onto a predetermined projection surface comprising a projection optical system, the projection optical system including:

a first decentering lens unit movable in a direction perpendicular to an optical axis of the projection optical system;

a second decentering lens unit movable in a direction perpendicular to an optical axis of the projection optical system and substantially perpendicular to a direction where the first decentering lens unit is moved;

a driving mechanism for continuously reciprocating the first and second decentering lens units in directions perpendicular to the optical axis; and a light valve situated on the display surface for displaying an image, having a plurality of pixels arranged with a predetermined pitch, each pixel displaying one point of the image, wherein the projected image on the projection surface is periodically shifted by reciprocating the first and second decentering lens units, wherein the image displayed on pixels are changed according to positions of the first and second decentering lens units, and wherein the first and second decentering lens units are disposed on a most end part of the display side of the projection optical system and the following conditions are fulfilled:

$0.01 \leq |FR/FD1| \leq 0.2$, and $0.01 \leq |FR/FD2| \leq 0.2$, where FD1 represents a focal length of the first decentering lens unit, FD2 represents a focal length of the second decentering lens unit, and FR represents a focal length of the rear lens unit.

24. The image projection apparatus as claimed in claim 23, wherein the first decentering lens unit has positive optical power, and the second decentering lens unit has negative optical power.

25. The image projection apparatus as claimed in claim 24, wherein the first decentering lens unit is a plane-convex lens element, the second decentering lens unit is a plane-concave lens element, and curved surfaces thereof are opposed to each other.

26. The image projection apparatus as claimed in claim 23, wherein the projection optical system is a zoom optical system whose focal length is variable.

27. The image projection apparatus as claimed in claim 23, wherein the pixel of the light valve is projected onto the projection surface by the projection optical system as an image element, and wherein movements of the first and second decentering lens units cause an image shift of 0.3 to 1 times of a pitch of the image element in a projection image on the projection surface.

28. The image projection apparatus as claimed in claim 23, wherein a locus of an image shifting on the projection surface by movements of the first and second decentering lens units is a circle.

29. The image projection apparatus as claimed in claim 23, wherein a locus of an image shifting on the projection surface by movements of the first and second decentering lens units is a quadrangle.

30. A projection optical system for projecting an image displayed on a predetermined display surface onto a predetermined projection surface comprising:

a front lens unit situated on the projection surface side;

a rear lens unit situated on the display surface side;

a decentering lens unit situated between the front lens unit and the rear lens unit, movable in a direction perpendicular to an optical axis of the projection optical system; and a driving mechanism for continuously reciprocating the decentering lens unit, wherein the projected image on the projection surface is periodically shifted by reciprocating the decentering lens unit, and wherein the following condition is fulfilled:

$0.01 \leq |FR/FD1| \leq 0.2$ where FD1 represents a focal length of the decentering lens unit, and FR represents a focal length of the rear lens unit.

31. A projection optical system for projecting an image displayed on a predetermined display surface onto a predetermined projection surface comprising:

a decentering lens unit movable in a direction perpendicular to an optical axis of the projection optical system, the decentering lens unit being disposed on a most end part of the display side of the projection optical system; and a driving mechanism for continuously reciprocating the decentering lens unit, wherein the projected image on the projection surface is periodically shifted by reciprocating the decentering lens unit, and the following condition is fulfilled:

$0.01 \leq |LB/FD1| \leq 0.2$ where FD1 represents a focal length of the decentering lens unit, and LB represents an air distance equivalent of a back focal distance of a part of the projection optical system except the decentering lens unit.

32. The projection optical system as claimed in claim 30, further comprising an aperture stop situated between the front and rear lens units, and wherein the decentering lens unit is situated at the vicinity of the aperture stop.

33. The projection optical system as claimed in claim 30, wherein the projection optical system is a zoom optical system having a movable lens unit that is movable in a direction of the optical axis for zooming, the movable lens unit being included only in the front lens unit.

34. The projection optical system as claimed in claim 30, wherein the decentering lens unit is supported by a lens frame and wherein the driving mechanism includes:

a supporter for supporting the lens frame so as to be rotatable; and an actuator for rotating the lens frame about the supporter in a plane perpendicular to the optical axis of the projection optical system, the actuator disposed substantially on the opposite side of the supporter with respect to a center of the decentering lens unit.

35. The projection optical system as claimed in claim 30, wherein the lens unit is supported by a lens frame and wherein the driving mechanism includes:

a guide shaft for guiding a movement of the decentering lens unit, fitted in a through hole provided in the lens frame;

an actuator for linearly reciprocating the lens frame along the guide shaft, disposed on the opposite side of the guide shaft with respect to a center of the decentering lens unit.

36. The projection optical system as claimed in claim 30, wherein the decentering lens unit and the driving mechanism are integrated into a single optical unit.

37. The projection optical system as claimed in claim 31, wherein the projection optical system is a zoom optical system whose focal length is variable.

38. The projection optical system as claimed in claim 31, wherein the decentering lens unit is supported by a lens frame and wherein the driving mechanism includes:

a supporter for supporting the lens frame so as to be rotatable; and an actuator for rotating the lens frame about the supporter in a plane perpendicular to the optical axis of the projection optical system, the actuator disposed substantially on the opposite side of the supporter with respect to a center of the decentering lens unit.

39. The projection optical system as claimed in claim 31, wherein the lens unit is supported by a lens frame and wherein the driving mechanism includes:

a guide shaft for guiding a movement of the decentering lens unit, fitted in a through hole provided in the lens frame;

an actuator for linearly reciprocating the lens frame along the guide shaft, disposed on the opposite side of the guide shaft with respect to a center of the decentering lens unit.

40. The projection optical system as claimed in claim 31, wherein the decentering lens unit and the driving mechanism are integrated into a single optical unit.

41. An image projection apparatus for projecting an image displayed on a predetermined display surface onto a predetermined projection surface comprising a projection optical system, the projection optical system including:

a front lens unit situated on the projection surface side;

a rear lens unit situated on the display surface side;

a decentering lens unit situated between the front lens unit and the rear lens unit, movable in a direction perpendicular to an optical axis of the projection optical system;

a driving mechanism for continuously reciprocating the decentering lens unit, and a light valve situated on the display surface for displaying an image, having a plurality of pixels arranged with a predetermined pitch, each pixel displaying one point of the image, wherein the projected image on the projection surface is periodically shifted by reciprocating the decentering lens unit, and wherein the following condition is fulfilled:

$$0.01 \leq |FR/FD1| \leq 0.2$$

where FD1 represents a focal length of the decentering lens unit, and FR represents a focal length of the rear lens unit.

42. The image projection apparatus as claimed in claim 41, wherein the projection optical system is a zoom optical system whose focal length is variable.

43. The image projection apparatus as claimed in claim 41, wherein the pixel of the light valve is projected onto the projection surface by the projection optical system as an image element, and wherein movement of the decentering lens unit causes an image shift of 0.3 to 1 times of a pitch of the image element in a projection image on the projection surface.

44. An image projection apparatus for projecting an image displayed on a predetermined display surface onto a predetermined projection surface comprising a projection optical system, the projection optical system including:

a decentering lens unit movable in a direction perpendicular to an optical axis of the projection optical system, the decentering lens unit being disposed on a most end part of the display side of the projection optical system;

a driving mechanism for continuously reciprocating the decentering lens unit, and a light valve situated on the display surface for displaying an image, having a plurality of pixels arranged with a predetermined pitch, each pixel displaying one point of the image, wherein the projected image on the projection surface is periodically shifted by reciprocating the decentering lens unit, and the following condition is fulfilled:

$$0.01 \leq |LB/FD1| \leq 0.2$$

where FD1 represents a focal length of the decentering lens unit, and

LB represents an air distance equivalent of a back focal distance of a part of the projection optical system except the decentering lens unit.

45. The image projection apparatus as claimed in claim 44, wherein the projection optical system is a zoom optical system whose focal length is variable.

46. The image projection apparatus as claimed in claim 44, wherein the pixel of the light valve is projected onto the projection surface by the projection optical system as an image element, and wherein movement of the decentering lens unit causes an image shift of 0.3 to 1 times of a pitch of the image element in a projection image on the projection surface.

* * * * *